(12) United States Patent
Fujimura

(10) Patent No.: US 9,122,916 B2
(45) Date of Patent: Sep. 1, 2015

(54) THREE DIMENSIONAL FINGERTIP TRACKING

(71) Applicant: Kikuo Fujimura, Palo Alto, CA (US)

(72) Inventor: Kikuo Fujimura, Palo Alto, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 327 days.

(21) Appl. No.: 13/826,986

(22) Filed: Mar. 14, 2013

(65) Prior Publication Data

US 2014/0270352 A1 Sep. 18, 2014

(51) Int. Cl.
G06K 9/00 (2006.01)
G06F 3/033 (2013.01)
G06F 3/01 (2006.01)
G06K 9/44 (2006.01)

(52) U.S. Cl.
CPC ............ *G06K 9/00355* (2013.01); *G06F 3/017* (2013.01); *G06K 9/44* (2013.01)

(58) Field of Classification Search
None
See application file for complete search history.

(56) References Cited

U.S. PATENT DOCUMENTS

| | | | |
|---|---|---|---|
| 6,147,678 A * | 11/2000 | Kumar et al. | 345/158 |
| 6,204,852 B1 | 3/2001 | Kumar et al. | |
| 7,148,913 B2 | 12/2006 | Keaton et al. | |
| 7,308,112 B2 | 12/2007 | Fujimura et al. | |
| 7,774,075 B2 | 8/2010 | Lin | |
| 7,877,706 B2 | 1/2011 | Albertson et al. | |
| 7,893,920 B2 | 2/2011 | Endoh | |
| 8,259,163 B2 | 9/2012 | Bell | |
| 8,723,789 B1 * | 5/2014 | Rafii | 345/156 |
| 2003/0095140 A1 * | 5/2003 | Keaton et al. | 345/700 |
| 2008/0244468 A1 * | 10/2008 | Nishihara et al. | 715/863 |
| 2008/0273755 A1 * | 11/2008 | Hildreth | 382/103 |
| 2009/0002342 A1 * | 1/2009 | Terada et al. | 345/175 |
| 2009/0278915 A1 | 11/2009 | Kramer et al. | |
| 2010/0194713 A1 * | 8/2010 | Kawashima et al. | 345/175 |
| 2010/0199232 A1 | 8/2010 | Mistry et al. | |
| 2010/0214267 A1 | 8/2010 | Radivojevic et al. | |
| 2010/0329509 A1 * | 12/2010 | Fahn et al. | 382/103 |
| 2011/0074675 A1 * | 3/2011 | Shiming et al. | 345/158 |
| 2011/0219340 A1 | 9/2011 | Pathangay et al. | |
| 2012/0105613 A1 * | 5/2012 | Weng et al. | 348/77 |
| 2012/0113241 A1 * | 5/2012 | Sundaresan et al. | 348/77 |
| 2012/0117514 A1 | 5/2012 | Kim et al. | |
| 2012/0212413 A1 | 8/2012 | Plagemann et al. | |
| 2012/0235904 A1 | 9/2012 | Plagemann et al. | |
| 2012/0268364 A1 | 10/2012 | Minnen | |
| 2013/0038521 A1 * | 2/2013 | Sugaya et al. | 345/156 |
| 2013/0063336 A1 * | 3/2013 | Sugimoto et al. | 345/156 |
| 2013/0257720 A1 * | 10/2013 | Noda et al. | 345/157 |
| 2013/0300659 A1 * | 11/2013 | Kang et al. | 345/158 |

(Continued)

OTHER PUBLICATIONS

"Hand Detection for Virtual Touchpad," Gerard Edwin et al, 2011 International Conference on Electrical Engineering and Informatics Jul. 17-19, 2011, Bandung, Indonesia, 5 pages.*
"Lightweight Palm and Finger Tracking for Real-Time 3D Gesture Control," Georg Hackenberg et al, IEEE Virtual Reality Mar. 19-23, 2011, Singapore, pp. 19-26.*

(Continued)

*Primary Examiner* — Wenpeng Chen
(74) *Attorney, Agent, or Firm* — Kegler Brown Hill & Ritter; James J. Pignor

(57) ABSTRACT

Systems and methods for detecting, tracking the presence, location, orientation and/or motion of a hand or hand segments visible to an input source are disclosed herein. Hand, hand segment and fingertip location and tracking can be performed using ball fit methods. Analysis of hand, hand segment and fingertip location and tracking data can be used as input for a variety of systems and devices.

20 Claims, 14 Drawing Sheets

(56) References Cited

U.S. PATENT DOCUMENTS

| | | | |
|---|---|---|---|
| 2013/0342459 A1 | 12/2013 | Karakotsios et al. | |
| 2014/0104163 A1* | 4/2014 | Ide et al. | 345/156 |
| 2014/0258942 A1* | 9/2014 | Kutliroff et al. | 715/863 |
| 2014/0361988 A1* | 12/2014 | Katz et al. | 345/156 |
| 2014/0375547 A1* | 12/2014 | Katz et al. | 345/156 |

OTHER PUBLICATIONS

German Patent Office Search Report, Oct. 6, 2014.

Raheja, J.L.; Chaudhary, A; Singal, K; Tracking of Fingertips and Centres of Palm using KINECT. Third International Conference on Computational Intelligence, Modeling & Simulation, Sep. 20-22, 2011, Malaysia.

* cited by examiner

THREE DIMENSIONAL FINGERTIP TRACKING

FIELD OF THE INVENTION

This application generally relates to computer vision and related technologies, and more specifically relates to identifying a hand, hand segments and sub-portions thereof for fingertip tracking.

BACKGROUND

A user's satisfaction with a particular technology is based in large part on ease of use due to the user interface. The design of a user interface affects the amount of effort the user must expend to provide input for the system, to interpret the output of the system, and the amount of effort it takes to learn how to do this.

Many devices are controlled using physical knobs, sliders, buttons, or virtual controls such as touch-screens and soft buttons. However, these mechanisms often demand the user's visual attention and can be quite difficult, or even dangerous, to operate while driving.

A driver may require driving directions, or desire other information pertinent to his surroundings, but has limited options for accessing that information. Most onboard navigation systems are disabled while the vehicle is in motion and many states have enacted distracted driving laws that prohibit the use of handheld cell phones while driving. Basic safe driving wisdom dictates that the driver's hands be kept on the steering wheel and his eyes on the road. However, drivers still have a need for timely information and real-time driver assistance.

Interfaces between users and technology integrate a variety of means to allow the technology to receive input from a user. One direction pursued by interface designers has been in gesture recognition and similar technologies. Motions or gestures can be identified and analyzed to trigger action related to a variety of devices. The use of human motions or gestures to convey input to a device can provide a speedy, intuitive means to control the device, especially in instances when traditional device controls (e.g., keyboard, mouse) are not practical.

Despite clear advantages, fingertip recognition is often limited by the resolution of systems employing it. For example, while a conventional motion sensor can recognize the presence of a hand in frame (e.g., within the "view" of one or more sensors capable of collecting input relevant to tracking fingertip location), a precise determination of the location and orientation of a fingertip is not straight forward. Current systems lack the ability and precision to accurately identify and track fingertip location, severely limiting their use.

Existing gesture tracking techniques fail to accurately detect the precise three dimensional location, orientation and motion of a fingertip and suffer from problems related to susceptibility of sensor inputs to noise which causes jitter and inaccuracies at the output. A major drawback in conventional fingertip location tracking is the difficulty of accurate estimation of the pointing direction, caused by variations in recognition and tracking accuracy, and the unreliability of direction estimation.

SUMMARY

The following presents a simplified summary of the disclosure in order to provide a basic understanding of some aspects of the disclosure. This summary is not an extensive overview of the disclosure. It is not intended to identify key/critical elements of the disclosure or to delineate the scope of the disclosure. Its sole purpose is to present some concepts of the disclosure in a simplified form as a prelude to the more detailed description that is presented later.

The disclosure disclosed and claimed herein, in one aspect thereof, comprises systems and methods for detecting, tracking and analyzing the presence, location, orientation and/or motion of a hand, finger or fingertip visible to an input source. Applications of such analysis can include use as an input to a system or device, for example, navigation, information, or entertainment systems, smart phone or other mobile device.

In particular embodiments, detection and recognition of a hand, hand segments and portions thereof, including fingers and portions thereof (e.g., fingertips) can be performed to detect and track three dimensional location data. The three dimensional fingertip tracking data can be used as an input to a wide range of systems and devices.

Recognition, analysis and tracking of a hand, and portions thereof (e.g. fingers, fingertips), visible to an input source can occur using, for example, a ball fit method or algorithm and various calculative techniques related to bodies anticipated to be visible to the input source. The recognition, analysis and tracking information can be used to interact with devices, and for other purposes.

To the accomplishment of the foregoing and related ends, certain illustrative aspects of the disclosure are described herein in connection with the following description and the annexed drawings. These aspects are indicative, however, of but a few of the various ways in which the principles of the disclosure can be employed and the subject disclosure is intended to include all such aspects and their equivalents. Other advantages and novel features of the disclosure will become apparent from the following detailed description of the disclosure when considered in conjunction with the drawings.

DETAILED DESCRIPTION

Figure 1:
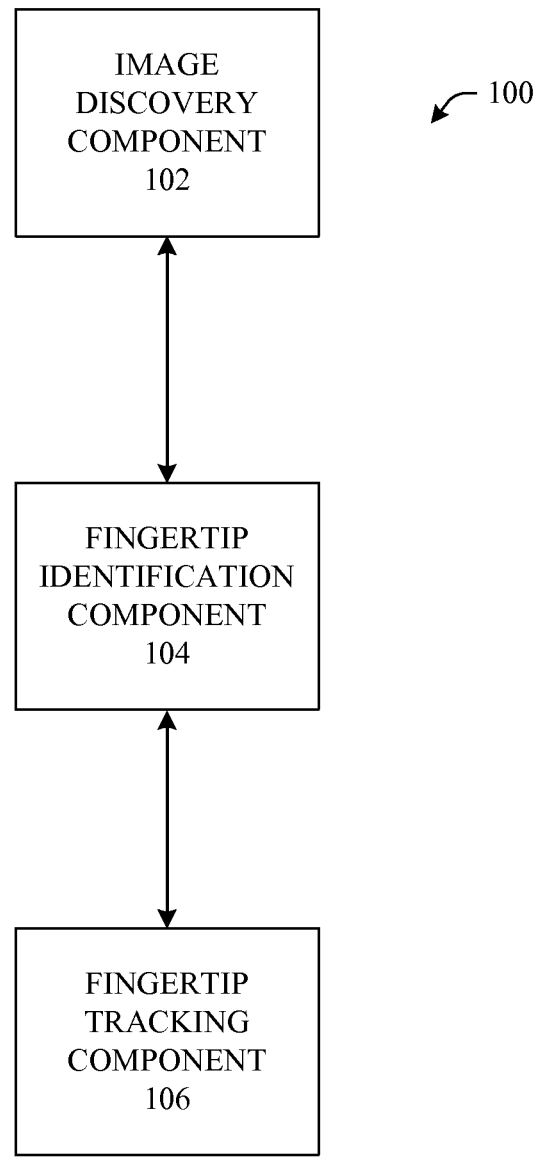
FIG. 1 illustrates an example block diagram of a system that facilitates gesture recognition.

The disclosure is now described, e.g., with reference to the drawings and other aspects herein. In the following description and drawings (incorporated herein), for purposes of explanation, numerous specific details are set forth in order to provide a thorough understanding of the subject disclosure. It may be evident, however, that the disclosure can be practiced without these specific details. In other instances, well-known structures and devices are shown in block diagram form in order to facilitate describing the disclosure.

In an embodiment, a computer implemented method for three dimensional fingertip tracking comprises utilizing one or more processors and memory storing one or more programs for execution by the one or more processors, the one or more programs including instructions for receiving sensor data associated with a hand, identifying a hand segment in the sensor data, establishing a generally circular observation area, advancing the observation area along an axis of the identified hand segment, calculating data associated with the hand segment within the observation area, and determining a fingertip location based on a position of the observation area.

In other embodiments, a three dimensional fingertip tracking system comprises an image discovery component that records at least one hand segment in a frame, a fingertip identification component that detects a fingertip location of the at least one hand segment, and a fingertip tracking component that tracks fingertip motion based on analysis of the at least one hand segment.

In a further embodiment, a fingertip tracking system comprises at least one image of at least one hand segment, a fingertip identification component that detects a fingertip location within the image, a processing component that receives and processes a fingertip location and at least one of a voice command, a user location or database information and an output component that provides an output based at least in part on the processed fingertip location and the voice command, user location or database information.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both/either an application running on a server and/or the server can be a component. One or more components can reside within a process and/or thread of execution, and a component can be localized on one computer and/or distributed between two or more computers.

A variety of implementations for computer-based aspects will be understood by those skilled in the art. In embodiments, various processing and/or storage devices including or coupled with displays can be used with aspects herein. For example, aspects herein can recognize a hand segment of a hand, and the location and/or motion of a fingertip involving at least in part computerized function. In an embodiment, a "heads-up display" (HUD) within a vehicle (e.g., display visible in regular field of view during driving) can reflect action resultant from the fingertip location and/or motion. In alternative or complementary embodiments, traditional controls and indicators (e.g., meters and gages below dash board, display associated with center console, shifter, steering apparatus, throttle, navigation system, entertainment system) within an automobile can reflect changes effected by fingertip location and/or motion.

In an embodiment, fingertip location and/or motion analysis can be combined with at least one of a voice command, GPS information and/or database information to produce an output. In an embodiment, the system and method can provide information in the form of driving directions, identification of world objects and the delivery of other information useful to a driver.

As used herein, the term "hand segment" can be a hand or portion of a hand in an image, frame or view in which fingertip location and/or tracking can be performed. For example, a hand moving within the field of view of a camera, or other sensor, can be a hand segment for purposes of the disclosures herein and claims unless otherwise noted. For illustrative purposes, fingers of the hand can in turn be one or more hand segments.

However, the use of the term hand segment should not be read to exclude other parts of an entire human (or other) body (e.g., head, including sub-parts of head such as eyes, nose and mouth; torso; arms, including sub-parts of arms such as arm above elbow, arm below elbow, and hand; legs, including sub-parts of legs such as leg above knee, leg below knee, and feet). The disclosures herein support instances or embodiments where the motions of an entire human body are analyzed to determine and track location and/or motion. The same techniques described for identifying and/or isolating fingers and fingertips can be employed to discretize limbs and other sub-portions of a human (or other) body.

As used herein, the term "world object" can be most any entity, or portion of an entity, non-limiting examples of which include a road, bridge, sign, building, monument, vehicle, place of business, or most any other entity or point of interest.

The location of a fingertip can be identified and tracked using a ball fit identification technique and/or other techniques. Ball fit detection generally refers to a series of techniques and algorithms in computer and machine vision for identifying objects and distinguishing aspects detected by a sensor. While techniques described herein refer specifically to methods of fingertip identification and tracking, it is to be appreciated that other means (e.g., identification of local extrema) can be employed alternatively or in accompaniment. Other techniques for identifying bodies, or improving the accuracy of their identification, can include the use of various processing algorithms. The output of the ball fit technique (e.g., data related to fingertip location, orientation and/or motion) can be used as input for other systems. For example, fingertip location, orientation and/or motion can be combined with at least one of a voice command, Global Positioning System (GPS) information and/or database information to produce an output.

Various inputs, images, data and/or information can be described in multiple versions or with respect to previously non-defined versions. Those skilled in the art will appreciate that throughout image processing and other aspects modifying inputs herein, copies can be generated and modified while preserving information from before modification. Embodiments herein can rely upon comparison and cross-processing of "before" and "after" versions of an input (e.g., original image and image with particular parameters applied, image with parameters applied). Unless expressly set forth otherwise, it should be understood that previous versions (or other language representing modifications, alternatives and/or editions not expressly recited) are recoverable and in-use through termination of a methodology or during utilization of a system.

In an example functioning of techniques as described herein, three dimensional fingertip tracking can be achieved. A capture means, for example a stereo camera, can be employed to capture a video or series of still frames including at least a perspective of a fingertip to be identified, located and/or tracked.

In embodiments, alternative methods of finger image capture can be employed. For example, in addition to changes in an image frame, sub-aspects thereof such as light and shadow can be analyzed. In other embodiments, changes to electrical fields can be detected to determine motion in space.

In alternative or complementary embodiments, techniques involving changes in temperature or thermal detection can be employed. Reflective energy (e.g., sound waves or infrared beams) can be employed to detect the presence of a hand segment and/or motion through a space in one or more additional embodiments. In one or more embodiments, detection of vibration or pressure can be employed to discern motion within a space.

A sensor, or capture means, for example a stereo or depth camera, can be employed to capture frames including at least a perspective of a fingertip to be identified, located and/or tracked. Once an object (e.g., hand, hand segment or portion thereof) is detected in a space, identification and/or tracking of a fingertip can begin.

Depth images or disparity maps, and sequences thereof, can be formulated from image frames acquired through the capture means. A portion of the image corresponding to a hand can be extracted and a hand segment, or skeleton, corresponding to a finger can be identified. Skeletons are key shape descriptors in object recognition and representation. The skeleton captures essential topology and shape information of the object in a simple form. Conventional algorithms can be used to discern the skeleton of the hand segment.

Conventional techniques for fingertip location simply choose an extreme point of an identified hand segment or skeleton, such as the top-most, left-most or closest point in a depth image, and designate that point as the fingertip. However, these simple techniques lack precision at least in part because the sensor inputs are subject to noise which causes jitter in the output and non-smooth finger contours in the resultant depth image or map. Choosing an extreme point from a non-smooth image and designating that point as a fingertip results in varying and unpredictable degrees of inaccuracy. The subject disclosure provides systems and methods for precise fingertip location and tracking that is accurate, robust and less susceptible to noise.

The ball fit method can be used to precisely locate and track fingertip location. The ball fit method includes identifying a hand segment, or skeleton, within a depth image, and calculating the width of the hand segment along its length. A ball, or generally circular observation area, whose radius is about one-half the average width of the hand segment, can be established. The ball can be "rolled", or advanced, along an axis of the hand segment in the direction of the hand segment's endpoint in successive movements. As the ball is rolled, or moved, along the hand segment, the number of pixels falling within the ball and corresponding to the hand can be counted. The ball can be advanced toward the hand segment end point until the number of hand pixels within the ball, or observation area, are less than or equal to about ninety percent of the total pixels within the ball. The fingertip location can be established as the center point of the ball when the ball is stopped.

In other embodiments, the ball can be "rolled", or advanced, along an axis of the hand segment from the hand segment's endpoint in the direction of the base of the hand segment in successive movements. As the ball is rolled, or moved, along the hand segment, the number of pixels falling within the ball and corresponding to the hand can be counted. For example, the ball can be advanced from a fingertip along an axis toward the base of the finger until the number of pixels associated with the finger within the ball, or observation area, are greater than or equal to about ninety percent of the total pixels within the ball. The fingertip location can be established as the center point of the ball when the ball is stopped.

In an embodiment, fingertip location and/or motion identified by the ball fit technique can be combined with a voice command, GPS information and/or other information to produce an output. For example, a driver can point and issue a voice command to the fingertip tracking system such as "What is this building?". The system can process the fingertip location information, voice command, a GPS location, map data, and/or other information and produce an output in response. The output can be, for example, an audio or visual output. In the present example, the system can respond with an audio output, for example, "Public parking, free after 4:00 pm." In other embodiments, the system can produce an output indicating route guidance or confirmation of a location or destination. The system can be used to obtain an output relative to sign information, shopping information, sightseeing information, advertising and most any other information of interest.

In accordance with an embodiment, the system can provide a driver with access to real-time, location specific information and driver assistance. While driving, the driver can access information while keeping his hands on the steering wheel and simply pointing a finger in the direction of the object of interest.

In further embodiments, fingertip location and/or motion identified by the ball fit technique can be utilized for three dimensional book marking, for example, by recording location data, capturing photos, audio and/or a video of an object or an event for later listening and/or viewing. For example, a driver or passenger may point to an object or event and the system can record GPS location data, audio, video, still photos and most any other information of interest associated with the object or event. The three dimensional bookmarking is useful for recording information for later reference that would be difficult or unsafe for a driver or passenger to record otherwise.

The above examples are provided not in order to provide comprehensive or exhaustive detailing of all techniques cognizable under these disclosures, but rather to suggest the spirit of the disclosure, and should not be read to limit the breadth of other aspects herein. Those skilled in the art will appreciate various alternative or complementary techniques employable in one or more aspects described above to similar or complementary effect without departing from the scope of the disclosure. The application is now described in relation to the figures.

FIG. 1 illustrates an example block diagram of a system 100 that facilitates three dimensional fingertip tracking. System 100 includes image discovery component 102, fingertip identification component 104, and fingertip tracking component 106.

Image discovery component 102 can include sensors (e.g., image sensors such as stereo cameras, depth cameras, charge-coupled devices, complementary metal oxide semiconductor active pixel sensors, infrared and/or thermal sensors, sensors associated with an image intensifier, and others) that receive at least one image, or other sensor data, capturing at least a portion of a human hand. In one or more embodiments, image discovery component 102 can be integrated into or with other components (e.g., 104, 106). An image, for example a record or frame, of the hand, or portion thereof, can be provided to fingertip identification component 104 for processing that facilitates the three dimensional identification of fingertip location and/or orientation.

Fingertip identification component 104 can use various identification techniques to identify one or more hand segments. For example, a hand segment, and/or fingers can be present within in a frame or space covered by image discovery component 102. Fingertip identification component 104 can utilize a ball fit method or other algorithms to identify portions of a hand, for example, hand segments, fingers or fingertips. In embodiments, fingertip identification component 104 can provide a plurality of different, or successive, versions of a captured fingertip location to fingertip tracking component 106 that is capable of tracking motion of the identified fingertip.

Figure 2:
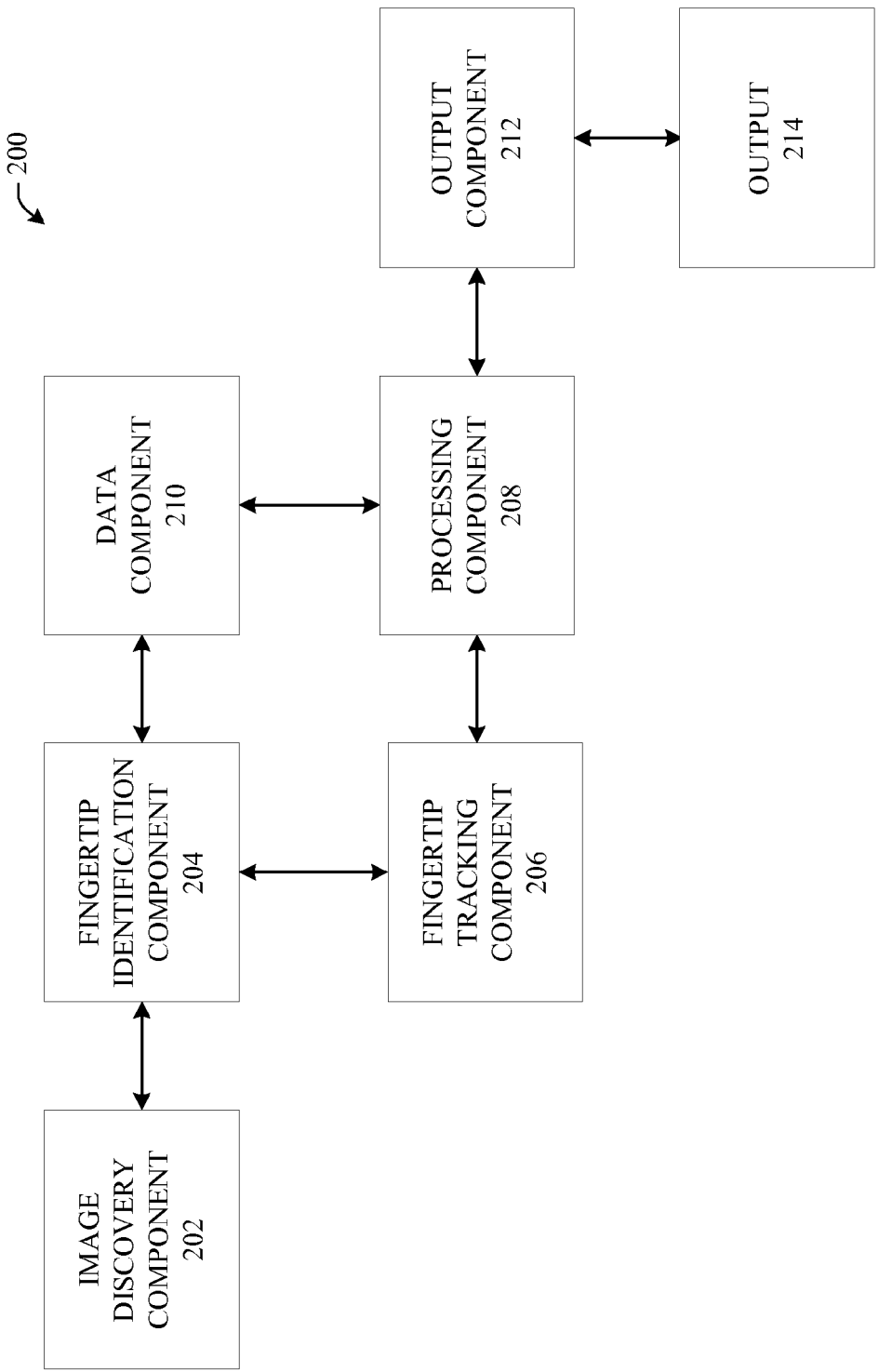
FIG. 2 illustrates an example block diagram of a system that provides user for recognizing motion of one or more moving bodies.

FIG. 2 illustrates an example block diagram of a system 200 that facilitates three dimensional fingertip tracking and providing an output based at least in part on a fingertip location. System 100 includes image discovery component 202, fingertip identification component 204, and fingertip tracking component 206, processing component 208, data component 210, and output component 212.

Image discovery component 202, fingertip identification component 204, and fingertip tracking component 206 can facilitate three dimensional fingertip tracking in the same or similar manner as image discovery component 102, fingertip identification component 104, and fingertip tracking component 106, discussed above in connection with FIG. 1.

Processing component 208 can receive fingertip tracking information from fingertip tracking component 206 for processing. Processing component 208 can also receive other forms and types of information from data component 210. Processing component 208 can include hardware and/or software capable of receiving and processing voice commands, for example, hardware and/or software capable of performing voice recognition and speech recognition.

Data component 210 can provide GPS information and/or database information to the processing component 208. In an embodiment, data component 210 can include information pertinent to a GPS location, map data, and/or other information or points of interest.

Output component 212 is capable of receiving input from the processing component 208 and can provide an audio, visual or other output 214 in response. For example, the output component 212 can provide an output, or outputs, 214 comprising route guidance, confirmation of a location or destination, and identification of world objects. In other embodiments, the output component 212 can provide an output 214 indicating sign information, shopping information, sightseeing information, advertising and any other information of interest. In an embodiment, output component 212 can provide an output 214 capable of being observed on, or for controlling, a heads-up display (HUD) within a vehicle, or can be used to manage other controls and indicators (e.g., meters and gages below dash board, display associated with center console, shifter, steering apparatus, throttle, navigation system, entertainment system, etc. . . . ).

Figure 3:
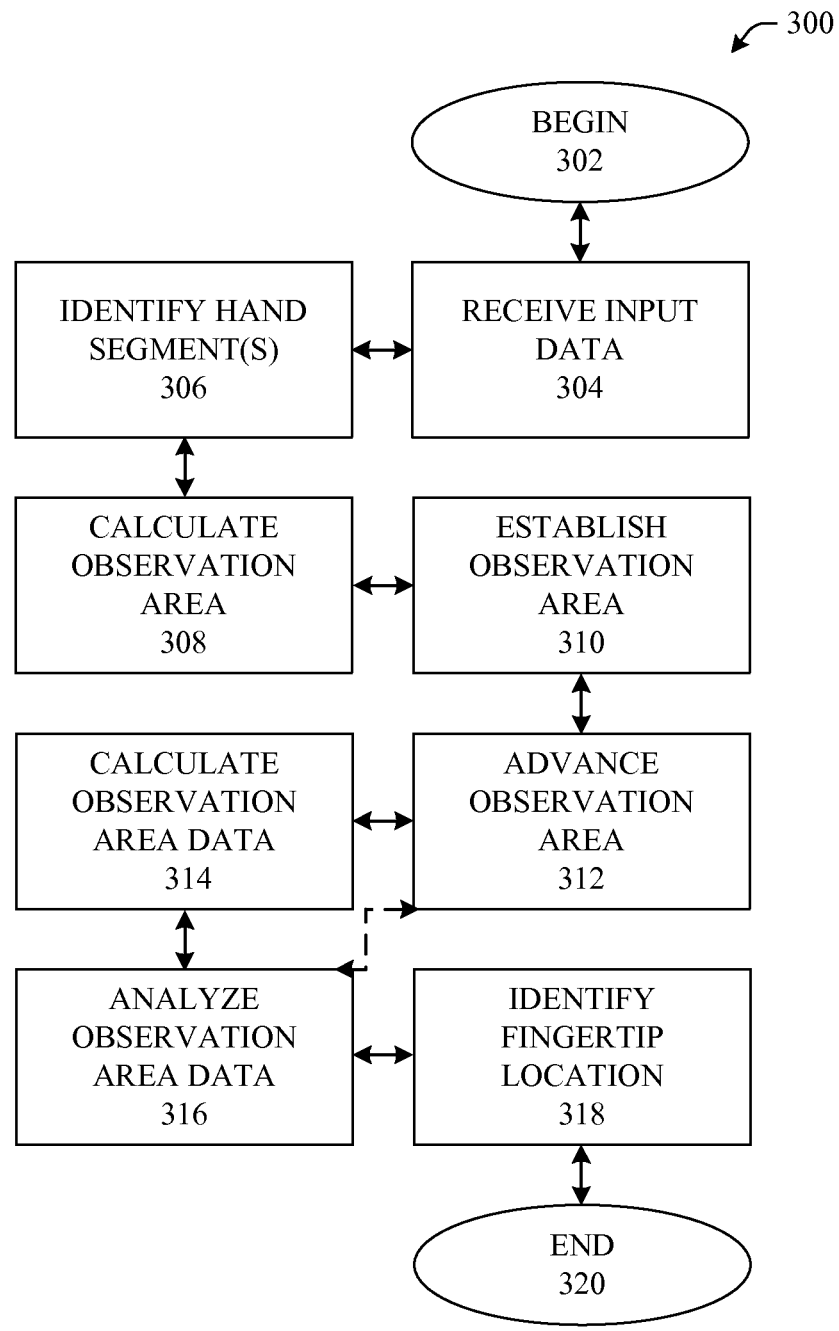
FIG. 3 illustrates an example block diagram of a methodology in accordance with illustrative embodiments of the disclosed system and method.

FIG. 3 illustrates an example block diagram of an example ball fit methodology 300 for three dimensional fingertip tracking. At 302, methodology 300 is initiated, and proceeds to 304 where input data is received. Input data can include one or more images, or sensor data, depicting at least one hand. At 306, at least one hand segment, for example a finger, is identified. In embodiments, a skeleton of the hand segment can be identified.

A 308, a generally circular observation area, or ball, can be calculated. The radius of the observation area can be calculated based on the average width of the hand segment identified at 306. The observation area is calculated to have a radius of about one-half the average width of the hand segment.

At 310, the observation area is established. The center point of the observation area is aligned with an axis of the identified hand segment. The axis of the hand segment can be the finger skeleton.

At 312, the observation area, or ball, can be "rolled", or advanced a distance, along the axis of the hand segment in the direction of the hand segment's endpoint.

At 314, data within the observation area is calculated. In an embodiment, pixels corresponding to the hand segment within the observation area of a depth image are counted.

At 316, the calculated data is analyzed. In an embodiment, the pixels corresponding to the hand segment within the observation area calculated at 314 are compared to the total number of pixels within the observation area. When the number of pixels within the observation area associated with the hand segment is greater than about ninety percent of the total pixels within the ball, the observation area is advanced 312 towards the hand segment's endpoint. When the number of pixels within the observation area associated with the hand segment are less than or equal to about ninety percent of the total pixels within the ball, the ball is stopped and the fingertip location can be identified.

At 318, the fingertip location can be identified. In an embodiment, the fingertip location can be identified as the center point of the ball, or observation area, when the ball is stopped. Thereafter, methodology 300 can proceed to end at 320. The fingertip location can be identified in successive images, or frames, to track motion of the fingertip. In an embodiment, the fingertip location can serve as an input and can be combined with other information, data, systems and methods to produce an output. For example, fingertip location and/or tracking information can be combined with at least one of a voice command, GPS information and/or database information to produce an output. In further embodiments, the method can provide audio and/or visual information in the form of route guidance, identification of world objects or other information of interest.

It is to be appreciated that while the subject methodology 300 examples are presented in the context of a human hand, other techniques involving identification of an end point of an extremity can be facilitated by aspects of methodology 300 an otherwise herein.

The ball fit method can be used to precisely locate and track fingertip location. The ball fit method includes identifying a hand segment, or skeleton, within a depth image, and calculating the width of the hand segment along its length. A ball, or generally circular observation area, whose radius is about one-half the average width of the hand segment, can be established. The ball can be "rolled", or advanced, along an axis of the hand segment in the direction of the hand segment's endpoint in successive movements. As the ball is rolled, or moved a distance, along the hand segment, the number of pixels falling within the ball and corresponding to the hand can be counted. The ball can be advanced toward the hand segment end point until the number of hand pixels within the ball, or observation area, are less than or equal to about ninety percent of the total pixels within the ball. The fingertip location can be established as the center point of the ball when the ball is stopped.

Figure 4:
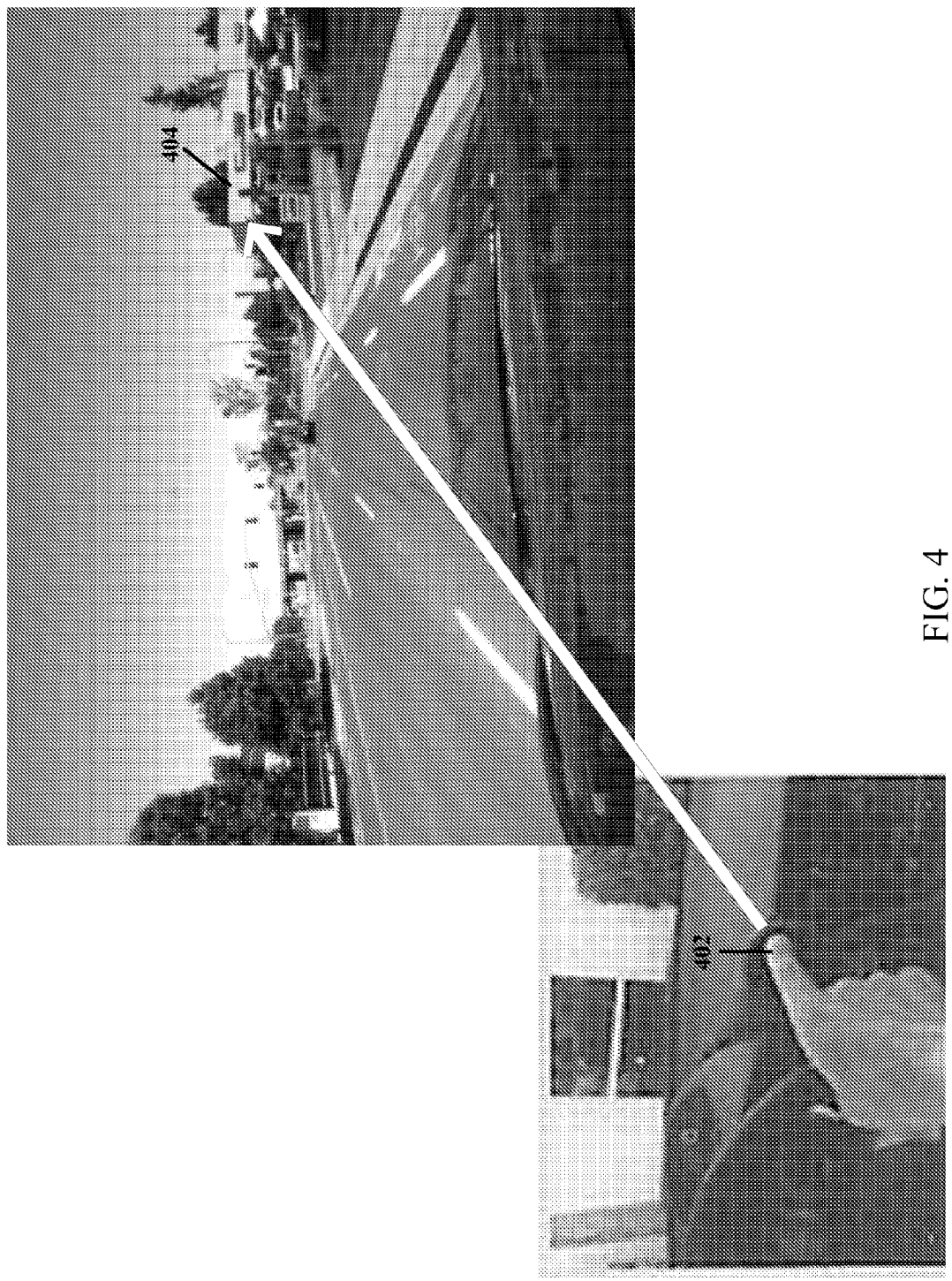
FIG. 4 illustrates an example use of the three dimensional fingertip tracking system in accordance with the subject disclosure.

FIG. 4 illustrates an exemplary use of the three dimensional fingertip tracking system in accordance with the subject disclosure. In an example, a driver (or occupant) can point an index finger 402 at an object of interest 404. The system can identify the fingertip location and orientation and provide information relating to the object of interest. Thus, the driver can access information relevant to his current surroundings while maintaining both hands on the steering wheel. In an embodiment, fingertip location data can be combined with a voice command, or other input, and the system can provide an output based on the fingertip location and other input.

The subject systems and methods can provide real-time information and/or driver assistance. In response to a fingertip location, and optionally other input such as GPS location and other relevant data, the system can provide, for example, route guidance information, confirmation of a present location and road sign information. The system can provide information relating to world objects pointed to by the driver. In an embodiment, the system can provide shopping information, for example, hours of operation, restaurant menus, prices and/or reviews. In further embodiments, the system can provide sightseeing information, for example, information related to points of interest, historical monuments, event information, advertising and tourist tips. The fingertip tracking system and method can take still pictures, or videos, in response to the driver's fingertip location or motion.

Figure 5:
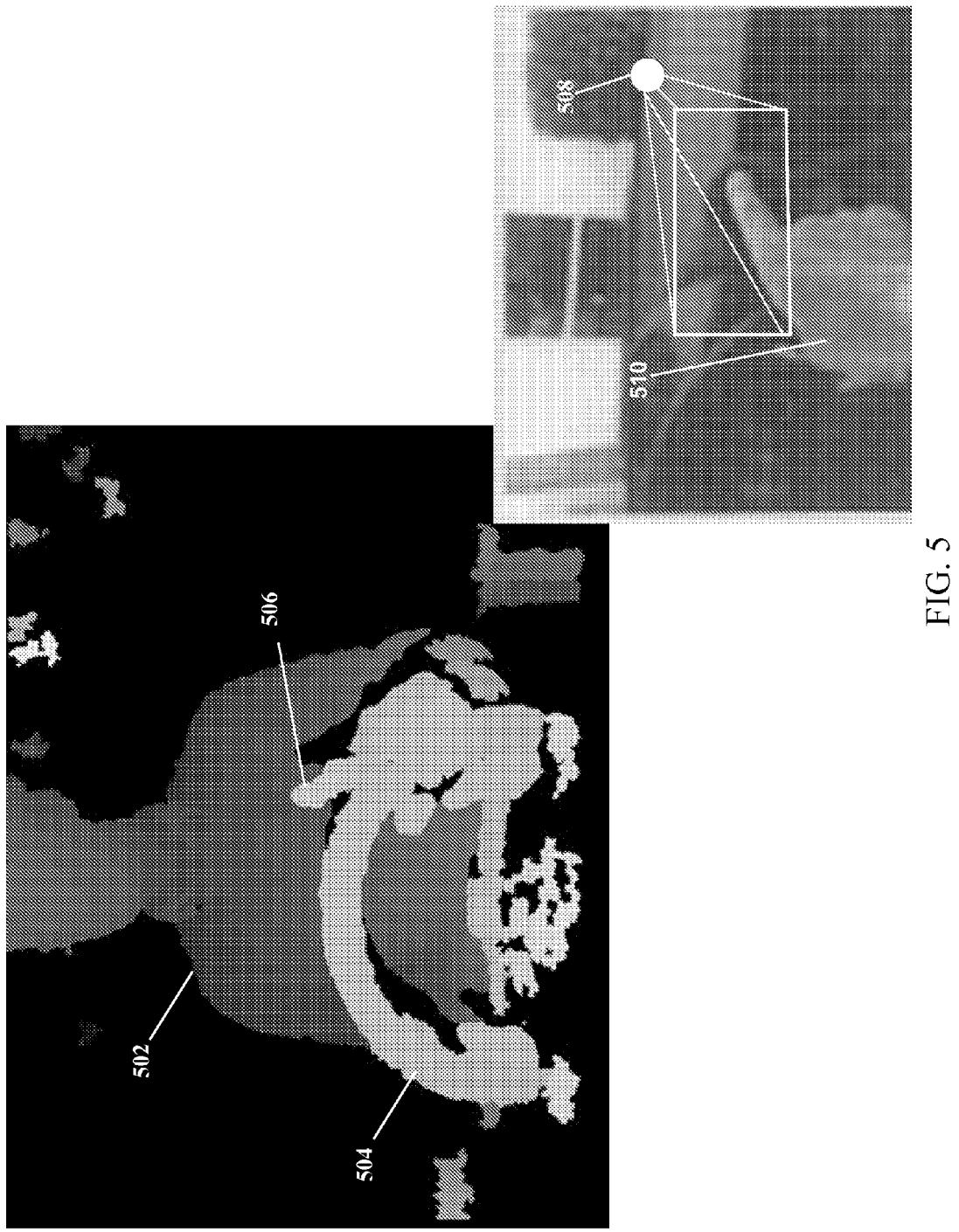
FIG. 5 illustrates aspects of the three dimensional fingertip tracking system and method in accordance with the subject disclosure.

FIG. 5 illustrates an example depth image of a driver 502 behind a steering wheel 504 pointing an index finger 506. A stereo camera 508 can capture images, frames, or image sequences, of the driver's hand 510 for use in fingertip tracking. In an embodiment, a camera 508, or other capture device, can be placed at a distance of approximately 40 cm to 80 cm from the location where the driver's hand normally grips the steering wheel. The images, or image sequences, can be analyzed, based at least in part on the ball fit method, and a precise three dimensional location of the fingertip can be identified and tracked. While specific orientations and combinations are described herein, it is to be appreciated that other configurations can be utilized without departing from the spirit of the disclosure.

Figure 6:
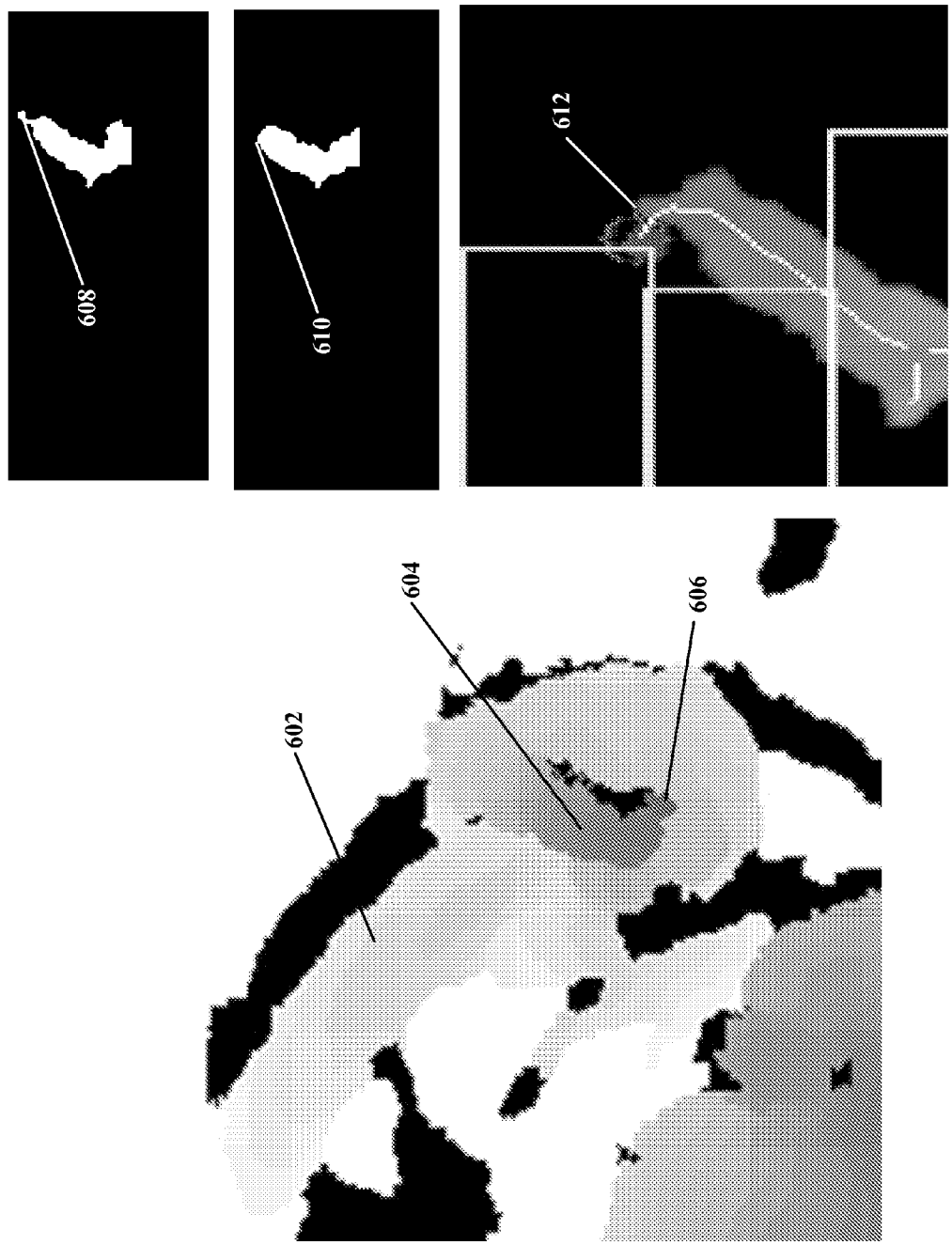
FIG. 6 illustrates an example of traditional fingertip identification methods.

FIG. 6 illustrates an example depth image of a driver behind a steering wheel 602 pointing an index finger 604. Spurious noise at the sensor inputs can cause non-smooth contours 606 in the output or depth image. For illustrative purposes, a depth image of a hand segment or finger can include non-smooth contours 608, generally caused by noise at the input or capture device. A depth image of a hand segment or finger can include a smooth finger outline 610. When the image includes non-smooth contours, traditional fingertip identification techniques are susceptible to inaccuracies. For example, a traditional technique can identify a left-most point 612 of a hand segment as a fingertip even though that point is indicative of noise.

Figure 7:
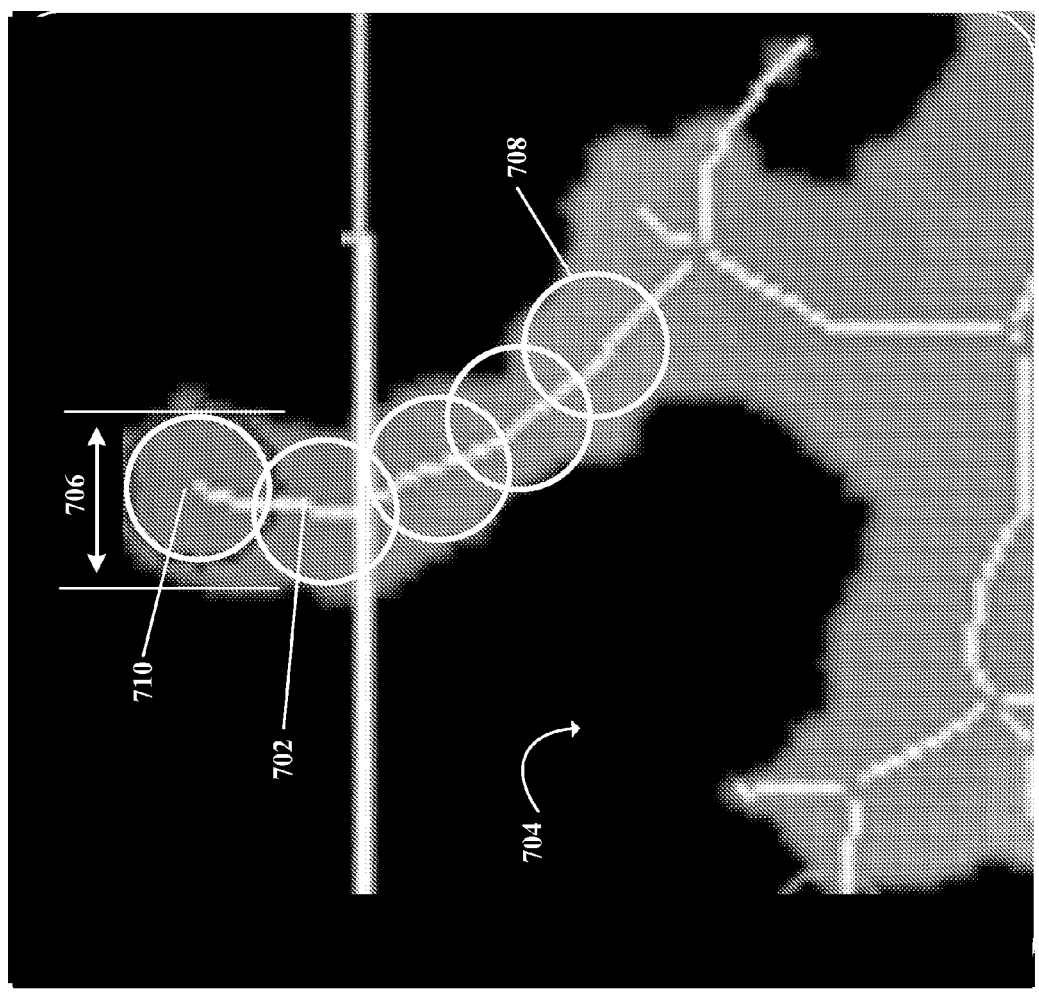
FIG. 7 illustrates an example of aspects of the three dimensional fingertip tracking system and method in accordance with the subject disclosure.

FIG. 7 illustrates an exemplary ball fit system and method for precisely tracking fingertip location. The ball fit method includes identifying a hand segment 702, or skeleton, within a depth image 704, and calculating the width of the hand segment along its length 706. A ball 708, or generally circular observation area, whose radius is about one-half the average width of the hand segment, is established. The ball can be "rolled", or advanced, along an axis of the hand segment in the direction of the hand segment's endpoint in successive movements. In an embodiment, the axis along which the ball is rolled corresponds to an axis of the identified hand segment or skeleton. The hand skeleton can be identified utilizing conventional algorithms. The hand segment can be a finger.

As the ball is rolled, or moved, along the hand segment, the number of pixels falling within the ball that correspond to the hand can be counted. The ball can be advanced toward the hand segment end point 710 until the number of hand pixels within the ball, or observation area, are less than or equal to about ninety percent of the total pixels within the ball. The fingertip location can be established as the center point of the ball 712 when the ball is stopped.

Figure 8:
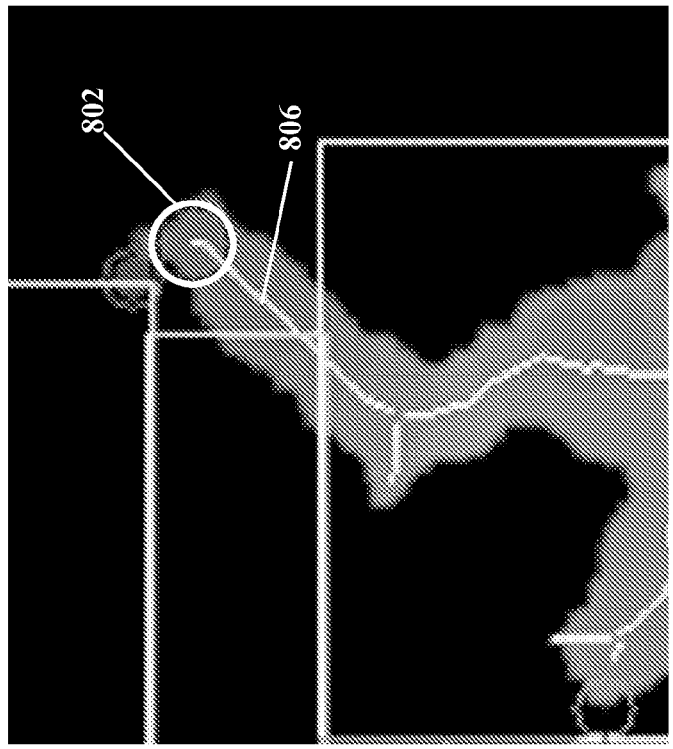
FIG. 8 illustrates an example of aspects of the three dimensional fingertip tracking system and method in accordance with the subject disclosure.
Figure 8:
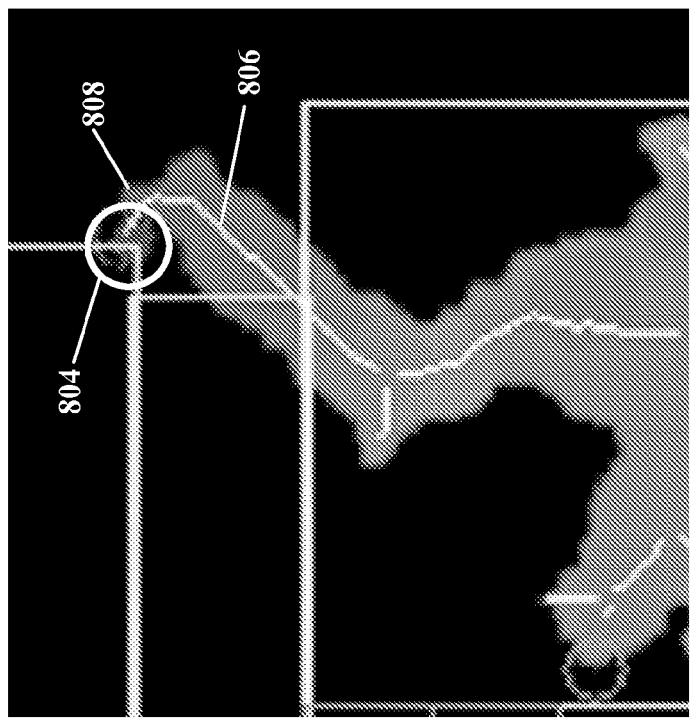

FIG. 8 illustrates a comparison of example fingertip tip tracking results utilizing a traditional fingertip location technique and the subject systems and methods. The systems and methods can identify and track a fingertip location 802 based on a precise, noise-resistant ball fit method. Traditional techniques for fingertip location simply choose an extreme point 804 of the identified hand segment or skeleton 806, such as the top-most or left-most point in a depth image, and designate that point as the fingertip. However, the depth image of the hand segment can include non-smooth contours 808 due to noise at the input. The noise can be caused by, for example, reflections off of an object, shadows from a light source, background lighting, and color pattern of the object. Sensor inputs (e.g. capture devices, cameras, etc) are subject to noise which causes jitter in the output and non-smooth finger contours 808 in the resultant depth image or disparity map. Because traditional techniques for fingertip location are based on choosing an extreme point from a potentially non-smooth image, and designating that point as the fingertip, these techniques are prone to unpredictable degrees of inaccuracy.

Figure 9:
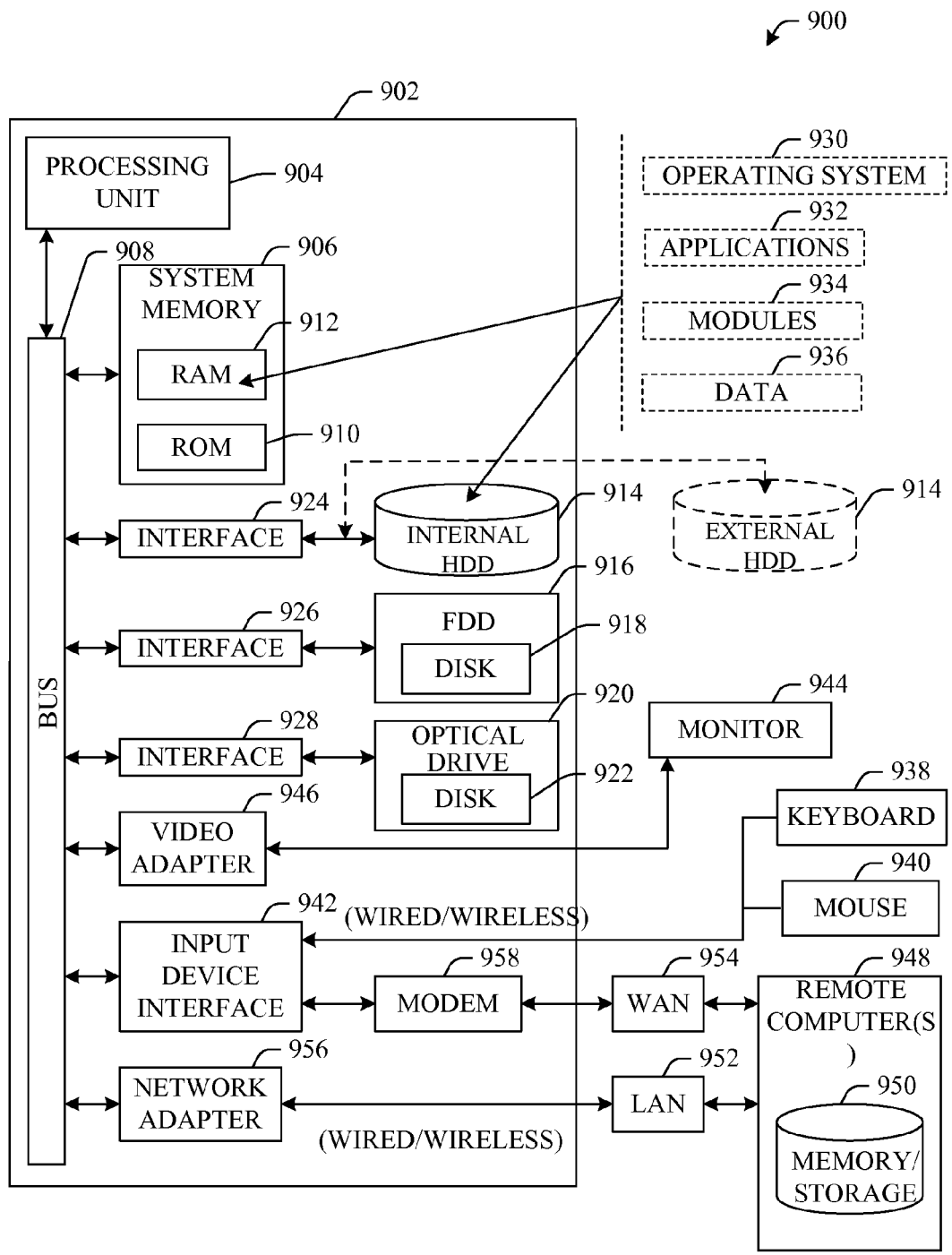
FIG. 9 illustrates a block diagram of an example computing system that can be used in conjunction with aspects described herein.
Figure 10:
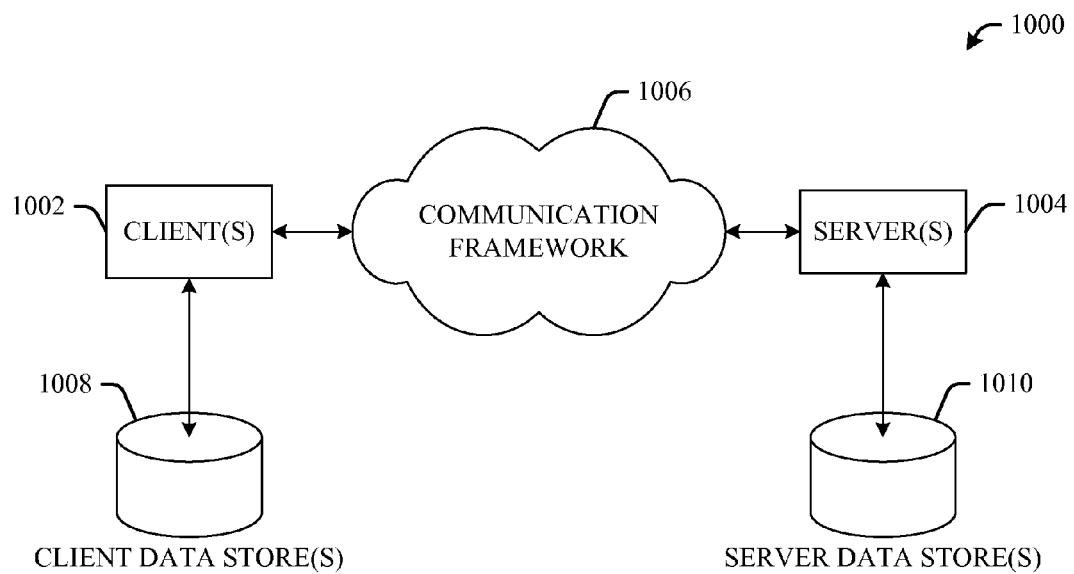
FIG. 10 illustrates a block diagram of an example network system that can be used in conjunction with aspects described herein.

FIG. 9 illustrates a brief general description of a suitable computing environment wherein the various aspects of the subject disclosure can be implemented, and FIG. 10 illustrates a schematic diagram of a client-server-computing environment wherein the various aspects of the subject disclosure can be implemented.

With reference to FIG. 9, the exemplary environment 900 for implementing various aspects of the disclosure includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA). Alternatively or in addition, an external hard disk drive 915 can also be configured for external use in a suitable chassis (not shown), a magnetic disk drive, depicted as a floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drives 914, 915 magnetic disk drive 916 and optical disk drive 920 can be connected to the system bus 908 by a hard disk drive interface 924, a magnetic disk drive interface 926 and an optical drive interface 928, respectively. The interface 924 for external drive implementations can include Universal Serial Bus (USB), IEEE 1394 interface technologies, and/or other external drive connection technologies.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosure.

A number of program modules can be stored in the drives and system memory 906, including an operating system 930, one or more application programs 932, other program modules 934 and program data 936. All or portions of the operating system, applications, modules, and/or data can also be cached in the RAM 912. It is appreciated that the disclosure can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an IR remote control, a stereo camera, sensors, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, et cetera A monitor 944 or other type of display device is also connected to the system bus 908 via an interface, such as a video adapter 946. In addition to the monitor 944, a computer typically includes other peripheral output devices (not shown), such as speakers, printers, et cetera The computer 902 can operate in a networked environment using logical connections via wired and/or wireless communications to one or more remote computers, depicted as remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 is connected to the local network 952 through a wired and/or wireless communication network interface or adapter 956. The adapter 956 can facilitate wired or wireless communication to the LAN 952, which can also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942 as depicted. It should be appreciated that the modem 958 can be connected via a USB connection, a PCMCIA connection, or another connection protocol. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, camera, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, et cetera) to provide secure, reliable, fast wireless connectivity. A Wi-Fi network can be used to connect computers to each other, to the Internet, and to wired networks (which use IEEE 802.3 or Ethernet).

FIG. 10 is a schematic block diagram of a sample-computing environment 1000 that can be employed for practicing aspects of the aforementioned methodology. The system 1000 includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). The servers 1004 can house threads to perform transformations by employing the components described herein, for example. One possible communication between a client 1002 and a server 1004 can be in the form of a data packet adapted to be transmitted between two or more computer processes. The system 1000 includes a communication framework 1006 that can be employed to facilitate communications between the client(s) 1002 and the server(s) 1004. The client(s) 1002 are operatively connected to one or more client data store(s) 1008 that can be employed to store information local to the client(s) 1002. Similarly, the server(s) 1004 are operatively connected to one or more server data store(s) 1010 that can be employed to store information local to the servers 1004.

Testing

The following examples are set forth merely to further illustrate three dimensional fingertip tracking. The illustrative examples should not be construed as limiting the fingertip tracking system or method in any manner.

Figure 11:
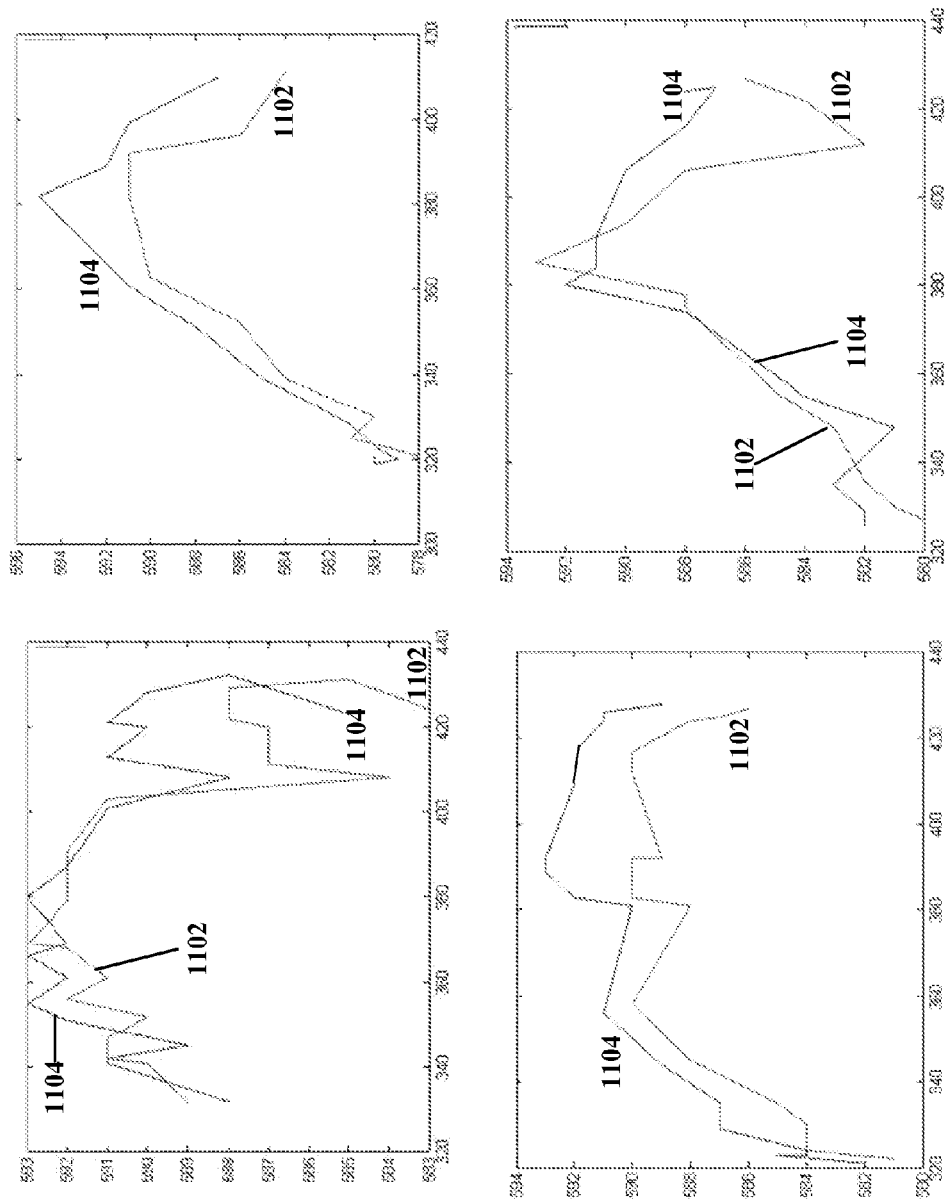
FIG. 11 is a graph illustrating test results achieved in accordance with embodiments of the disclosed system and method.

FIG. 11 presents four graphical representations of three dimensional fingertip location data generated utilizing the ball fit method 1102 of the subject disclosure as compared to ground truth 1104, i.e. the measured location of the fingertip. It can be seen that in each instance, the ball fit method tracks the measured fingertip location.

Figure 12:
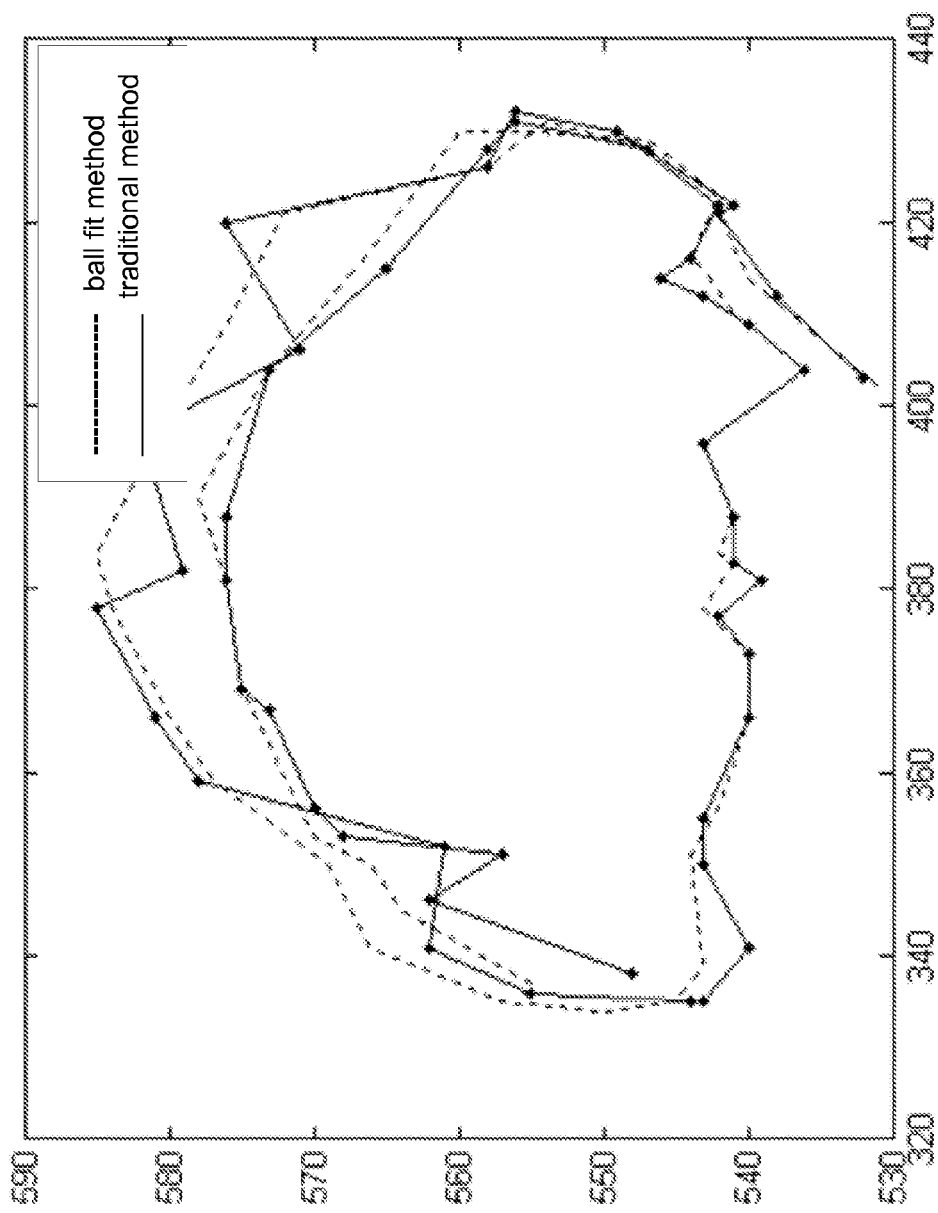
FIG. 12 is a graph illustrating test results achieved in accordance with embodiments of the disclosed system and method.

FIG. 12 presents a graphical representation of three dimensional fingertip location pixel data gathered utilizing the ball fit method of the disclosure as compared to fingertip location pixel data gathered using a traditional fingertip location technique. Ball fit fingertip location pixel data is represented by the broken line, and traditional fingertip location pixel information is shown as a solid line. It can be seen that the trajectory of the line generated from data gathered utilizing the ball fit method is much smoother than that of the data gathered with traditional techniques which exhibits a number of excursions and deviations. The relativeness smoothness of the ball fit method data trajectory can be attributed to the robust noise resistance of the subject systems and methods.

Figure 13:
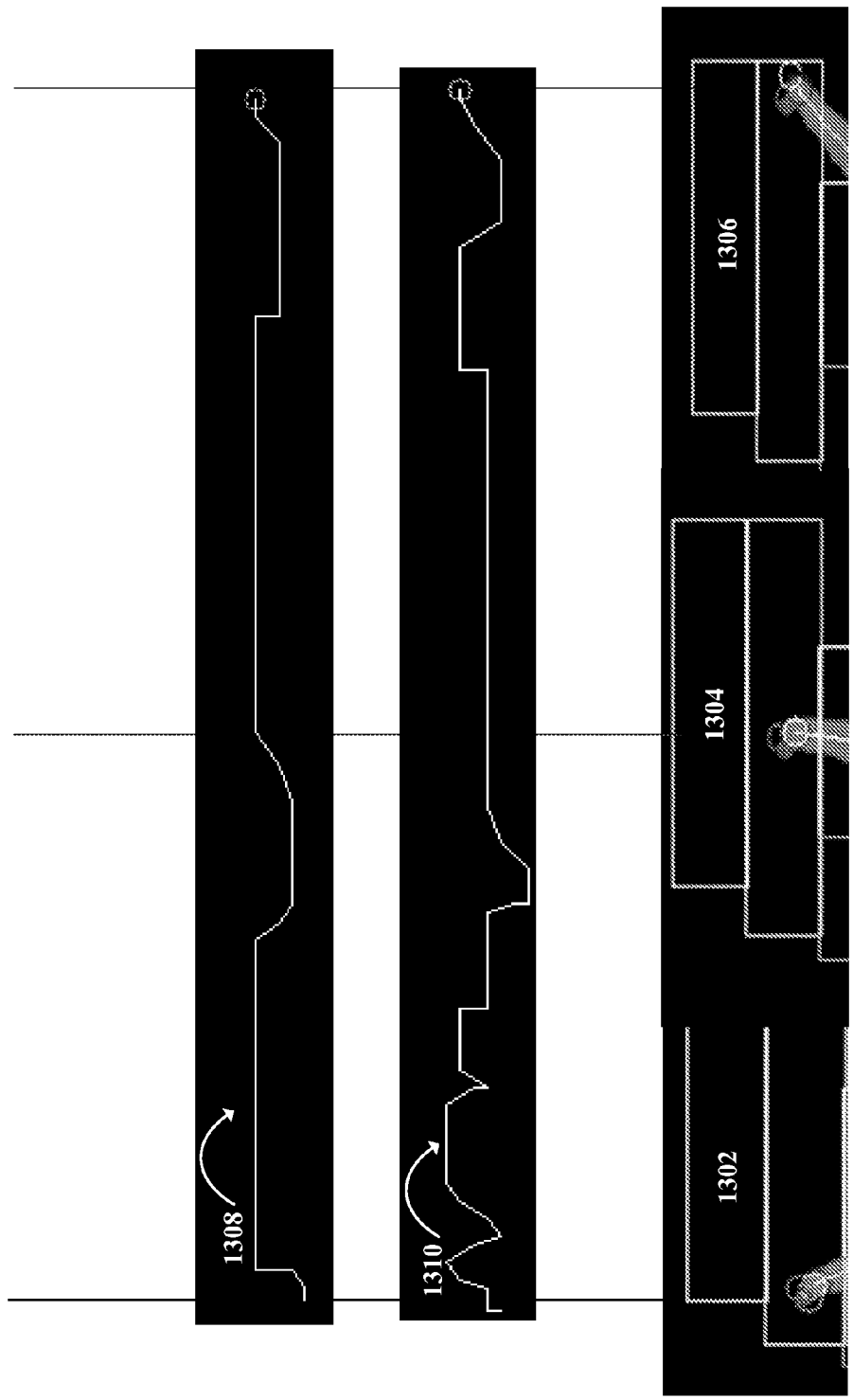
FIG. 13 is a graph illustrating test results achieved in accordance with embodiments of the disclosed system and method.

FIG. 13 presents a graphical representation of smoothness test results. A fingertip was moved from left to right along a horizontal line 1302, 1304, 1306 and a trace of the fingertip location was plotted on a screen as a polyline. It can be observed that the polyline 1308, generated utilizing the ball fit method, exhibits less excursions and/or deviations than that of the data gathered with traditional techniques, i.e. polyline 1310. The relativeness smoothness of the ball fit line trajectory 1308 can be attributed to the robust noise resistance of the subject systems and methods.

Figure 14:
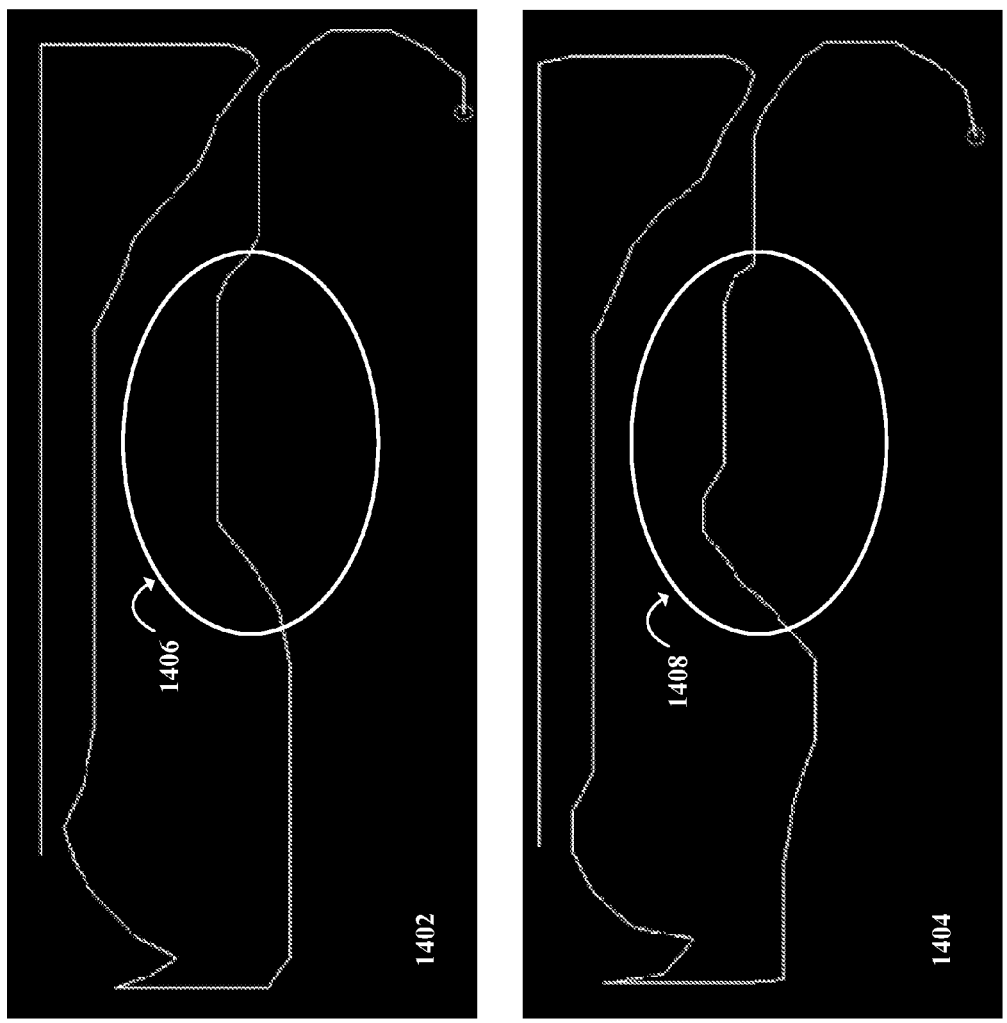
FIG. 14 is a graph illustrating test results achieved in accordance with embodiments of the disclosed system and method.

FIG. 14 presents a graphical representation of smoothness test results. The smoothness test was conducted by freely moving a fingertip and plotting a trace of the fingertip location on a screen as a connected series of line segments, or polyline. Both polylines 1402 and 1404 are based on the same input or capture data. It can be seen that portions of the polyline 1406 generated utilizing the ball fit method to identify fingertip location exhibits less excursions and/or deviations than that of the fingertip location data generated using a traditional technique 1408. The relativeness smoothness of the ball fit line trajectory can be attributed to the robust noise resistance of the subject systems and methods.

Testing was conducted to determine a stability index factor for fingertip location using the ball fit method and using a simple, or traditional, method. The test method for determining the stability index factor of a fingertip location identifier was performed by moving a finger to cover a specific colored cell on a display. The hand is held still while pointing to the cell and frame data of the finger is collected. The cell is moved to a different location and the finger is moved to the new cell location. Frame data of the finger is captured at each location. The stability index factor can be calculated as $$STD = \sqrt{(p1-p\_avg)^2 ... (pi-p\_avg)^2 / N}$$

where p1-pi are pixel positions, P_avg is the average of Pi and N is the length of Pi. The stability index factor for fingertip location determined using a simple method was calculated according to the formula above to be 2.13. The stability index factor for fingertip location determined using the present method was calculated according to the formula above to be 1.40. Because a lower stability index factor is an indication of increased stability, the test results confirm that the ball fit method is more stable than the traditional simple method of fingertip identification when pointing to a specific position in space.

What has been described above includes examples of the various versions. It is, of course, not possible to describe every conceivable combination of components or methodologies for purposes of describing the various versions, but one of ordinary skill in the art can recognize that many further combinations and permutations are possible. Accordingly, the subject specification intended to embrace all such alterations, modifications, and variations that fall within the spirit and scope of the appended claims.

It is appreciated that, while aspects of the subject disclosure described herein focus in wholly-automated systems, this should not be read to exclude partially-automated or manual aspects from the scope of the subject disclosure. Practicing portions or all of some embodiments manually does not violate the spirit of the subject disclosure.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature can have been disclosed with respect to only one of several implementations, such feature can be combined with one or more other features of the other implementations as can be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

In view of the example systems described supra, methodologies that can be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

The invention claimed is:

1. A computer implemented method for three dimensional fingertip tracking, comprising:
   utilizing one or more processors and memory storing one or more programs for execution by the one or more processors, the one or more programs including instructions for:
   receiving sensor data associated with a hand;
   identifying a hand segment in the sensor data;
   establishing a generally circular observation area;
   advancing at least a portion of the generally circular observation area along an axis of the identified hand segment;

calculating data associated with the hand segment within the observation area; and determining a three dimensional fingertip location based at least in part on the calculated data and a position of the observation area.

2. The fingertip tracking method of claim 1, wherein establishing a generally circular observation area comprises:

calculating an average width of the hand segment; and generating the generally circular observation area having a radius of about one-half of the calculated average width of the hand segment.

3. The fingertip tracking method of claim 2, wherein the hand segment is a finger associated with the hand.

4. The fingertip tracking method of claim 1, wherein the sensor data comprises data associated with a depth map.

5. The fingertip tracking method of claim 4, wherein calculating data associated with the hand segment within the observation area comprises:

calculating a percentage of pixels associated with the hand segment within the observation area.

6. The fingertip tracking method of claim 5, wherein determining the fingertip location comprises:

establishing the three dimensional fingertip location as a center of the generally circular observation area when the calculated percentage of pixels associated with the hand segment within the observation area is less than about ninety percent.

7. The method of claim 1, further comprising tracking fingertip motion based at least in part on determining the three dimensional fingertip location at an interval.

8. The fingertip tracking method of claim 1, further comprising:

establishing a location of a user;

receiving a voice command from the user;

accessing at least one database that stores information relevant to the user's location; and providing a response based on the fingertip location, and at least one of the voice command, the user's location, or the database information.

9. The fingertip tracking method of claim 8, wherein providing the response includes providing at least one of an audio or visual response.

10. The fingertip tracking method of claim 8, wherein providing the response includes providing information relevant to a world object identified by the three dimensional fingertip location.

11. A three dimensional fingertip tracking system comprising:

a memory;

a processor that executes the following computer executable components stored in the memory:

an image discovery component that records at least one hand segment in a frame;

a fingertip identification component that:

advances a generally circular observation area along an axis of an identified hand segment in a frame;

calculates data associated with the hand segment within the generally circular observation area; and detects a fingertip location within the at least one hand segment based on a position of the generally circular observation area; and a fingertip tracking component that tracks three dimensional fingertip motion based on analysis of the at least one hand segment.

12. The fingertip tracking system of claim 11, wherein the fingertip identification component determines the fingertip location as a center of the generally circular observation area when the calculated data indicates a percentage of pixels associated with the hand segment within the observation area is less than about ninety percent of pixels within the observation area.

13. The fingertip tracking system of claim 11, wherein the image discovery component comprises a stereo camera that captures a series of frames.

14. The fingertip tracking system of claim 11, wherein the fingertip tracking component tracks fingertip motion based at least in part on detecting the fingertip location in the captured series of frames at an interval.

15. The fingertip tracking system of claim 11, further comprising:

a processing component that receives and processes a fingertip location and at least one of a voice command, a user location or database information; and an output component that provides an output based on the processed fingertip location and the voice command, user location or database information.

16. The fingertip tracking system of claim 15, wherein the output of the output component includes information relevant to a world object identified by the fingertip location.

17. The three dimensional fingertip tracking system of claim 11, wherein the generally circular observation area comprises a radius that is about one-half an average width of the hand segment.

18. The fingertip tracking system of claim 11, wherein the fingertip identification component advances the generally circular observation area in successive movements along an axis of the hand segment in a direction of an endpoint of the hand segment.

19. A fingertip tracking system comprising:

a memory;

a processor that executes the following computer executable components stored in the memory:

at least one image of at least one hand segment;

a fingertip identification component that:

calculates data associated with an identified hand segment within a generally circular observation area;

advances the generally circular observation area along an axis of the identified hand segment until the calculated data associated with the hand segment within the observation area is less than about ninety percent; and determines a fingertip location within the image as a center of the generally circular observation area;

a processing component that receives and processes the fingertip location and at least one of a voice command, a user location, or database information; and an output component that provides an output based at least in part on the processed fingertip location, voice command, user location, or database information.

20. The fingertip tracking system of claim 19, wherein the output includes information relevant to a world object identified by the fingertip location.

* * * * *